(12) United States Patent
Lee et al.

(10) Patent No.: US 11,870,277 B2
(45) Date of Patent: Jan. 9, 2024

(54) BACK-DATA TRANSMISSION CIRCUIT ROBUST TO LOAD CHANGES AND METHOD THEREOF

(71) Applicant: Korea University Research and Business Foundation, Seoul (KR)

(72) Inventors: Hyung-Min Lee, Seoul (KR); Hyun-Su Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 17/825,586

(22) Filed: May 26, 2022

(65) Prior Publication Data

US 2023/0009325 A1 Jan. 12, 2023

(30) Foreign Application Priority Data

Jul. 8, 2021 (KR) .......................... 10-2021-0089783

(51) Int. Cl.
*H02J 50/80* (2016.01)
*H02J 50/12* (2016.01)

(52) U.S. Cl.
CPC .............. *H02J 50/80* (2016.02); *H02J 50/12* (2016.02)

(58) Field of Classification Search
CPC ............. H02J 50/12; H02J 50/80; H02J 50/10
See application file for complete search history.

(56) References Cited

U.S. PATENT DOCUMENTS

| | | |
|---|---|---|
| 9,574,441 B2 | 2/2017 | Liu et al. |
| 10,097,050 B2 | 10/2018 | Perry |
| 2012/0161538 A1* | 6/2012 | Kinoshita ............... H02J 50/12 307/104 |
| 2012/0326662 A1* | 12/2012 | Matsumoto ............. H02J 50/70 320/108 |
| 2016/0036244 A1* | 2/2016 | Griffith ................... H02J 50/40 307/104 |
| 2018/0323656 A1* | 11/2018 | Haas ..................... H04B 5/0037 |
| 2019/0103765 A1* | 4/2019 | Khandelwal ......... H03K 5/1536 |
| 2022/0131424 A1* | 4/2022 | Charthad ............. H04B 13/005 |

FOREIGN PATENT DOCUMENTS

| | | |
|---|---|---|
| KR | 10-2013-0033704 A | 4/2013 |
| KR | 10-2013-0120912 A | 11/2013 |
| KR | 10-2015-0028133 A | 3/2015 |
| KR | 10-1907291 B1 | 10/2018 |
| KR | 10-2206796 B1 | 1/2021 |

OTHER PUBLICATIONS

Korean Office Action dated Jul. 8, 2022 in corresponding Korean Patent Application No. 10-2021-0089783 (6 pages in Korean).

* cited by examiner

*Primary Examiner* — Rexford N Barnie
*Assistant Examiner* — Joseph N Inge
(74) *Attorney, Agent, or Firm* — NSIP Law

(57) ABSTRACT

Provided is a back-data transmission circuit generating a sensing signal using an arbitrary sensor, generating an input signal by digitally converting the sensing signal, generating a modulation signal by performing a modulation operation when there is a change in the input signal, inducing the modulation signal and transmitting the modulation signal to the transmitting terminal, measuring an induction signal induced from a receiving terminal to the transmitting terminal, and generating an output signal by calculating a slope of a voltage change represented by the induction signal.

6 Claims, 6 Drawing Sheets

BACK-DATA TRANSMISSION CIRCUIT ROBUST TO LOAD CHANGES AND METHOD THEREOF

CROSS-REFERENCE TO RELATED APPLICATION

This application claims priority to and the benefit of Korean Patent Application No. 10-2021-0089783, filed on Jul. 8, 2021, the disclosure of which is incorporated herein by reference in its entirety.

BACKGROUND

1. Field of the Invention

The present disclosure relates to a back-data transmission circuit robust to load changes and a method thereof, and more particularly, to a back-data transmission circuit and method for stably transmitting back-data regardless of load changes.

2. Discussion of Related Art

In recent years, a technique for wirelessly supplying power through wireless power transfer (WPT) has emerged in place of a technique for supplying power to an electronic device via wire.

In a WPT system, power is received or transmitted between a transmitting terminal and a receiving terminal through a change of a magnetic field in a coil. In this case, the transmitting terminal includes a power amplifier, an inductor-capacitor (LC) resonator having a high-quality coefficient at a target frequency, and a back-data demodulator. The receiving terminal includes an LC resonator having a high-quality coefficient at a target frequency, an alternate current/direct current (AC/DC) rectifier that converts an AC voltage into a DC voltage, a DC/DC converter that changes a voltage to apply a target voltage to a load, and a back-data modulator. Here, back-data refers to data obtained by digitalizing data, which is collected by a sensor, through an analog-to-digital converter during a back-telemetry process.

In this regard, in a coil-based wireless power transmission system, data communication may also be established between a transmitting terminal and a receiving terminal. In this case, in the wireless power transmission system, due to physical limitations of a coil structure, data can be transmitted or received only at low frequencies of several to several hundreds of MHz through the data communication.

In this case, for data communication, among various communication methods, a method of using only two coils to reduce a total system size is generally used, whereby data transmission is performed while wirelessly transmitting power by a pair of coils. As such, in a wireless power transmission system, data communication allows bidirectional communication, transmission of data from a transmitting terminal to a receiving terminal is referred to as forward telemetry, and transmission of data from the receiving terminal to the transmitting terminal is referred to as back telemetry.

However, a back-telemetry technique of the related art is disadvantageous in that it is difficult to stably transmit data due to a voltage change at a transmitting terminal due to load changes.

SUMMARY OF THE INVENTION

The present disclosure is directed to providing a back-data transmission circuit robust to load changes, which is a circuit capable of wirelessly transmitting power and stably transmitting back-data by reducing the influences of load changes, and a method thereof.

An aspect of the present disclosure provides a back-data transmission circuit including an input module including an arbitrary sensor and configured to generate an input signal by generating a sensing signal and digitally converting the sensing signal, a modulator configured to generate a modulation signal by performing a modulation operation when there is a change in the input signal, the modulation operation being performed by setting an open circuit mode and a short circuit mode in a preset order, starting from a point in time when the change in the input signal occurs, a receiving terminal configured to transmit the modulation signal to a transmitting terminal by inducing the modulation signal thereto, and a demodulator configured to generate an output signal by measuring an induction signal induced from the receiving terminal to the transmitting terminal and calculating a slope of a voltage change represented by the induction signal.

The modulator may perform the modulation operation in the open circuit mode for a predetermined first time interval, starting from a point in time when the change in the input signal occurs and perform the modulation operation in the short circuit mode for a predetermined second time interval after the first time interval.

The modulator may perform the modulation operation in the short circuit mode for a predetermined first time interval, starting from a point in time when the change in the input signal occurs and perform the modulation operation in the open circuit mode for a predetermined second time interval after the first time interval.

The back-data transmission circuit may further include an alternate current/direct current (AC/DC) rectifier configured to rectify an AC voltage, which is induced to a receiving terminal by the transmitting terminal, into a DC voltage in a charging mode, and a DC/DC converter configured to convert the DC voltage into a voltage set according to a load.

The demodulator may extract an envelope of the induction signal in the transmitting terminal, remove a high-frequency component from the induction signal from which the envelope is extracted, calculate a slope by differentiating the induction signal from which the high-frequency component is removed, and generate an output signal to represent a point in time when the slope exceeds a predetermined threshold.

Another aspect of the present disclosure provides a back-data transmission method performed by a back-data transmission circuit robust to load changes, the back-data transmission method including generating, by an input module with an arbitrary sensor, an input signal by generating a sensing signal and digitally converting the sensing signal, generating, by a modulator, a modulation signal by performing a modulation operation when there is a change in the input signal, the modulation operation being performed by setting an open circuit mode and a short circuit mode in a preset order, starting from a point in time when the change in the input signal occurs, inducing, by a receiving terminal, the modulation signal to a transmitting terminal and transmitting the modulation signal thereto, and generating, by a demodulator, an output signal by measuring an induction signal induced from the receiving terminal to the transmitting terminal and calculating a slope of a voltage change represented by the induction signal.

The modulator may perform the modulation operation in the open circuit mode for a predetermined first time interval, starting from a point in time when the change in the input signal occurs and perform the modulation operation in the short circuit mode for a predetermined second time interval after the first time interval.

The modulator may perform the modulation operation in the short circuit mode for a predetermined first time interval, starting from a point in time when the change in the input signal occurs and perform the modulation operation in the open circuit mode for a predetermined second time interval after the first time interval.

The back-data transmission method may further include rectifying by an alternate current/direct current (AC/DC) rectifier an AC voltage, which is induced by the transmitting terminal to a receiving terminal, into a DC voltage in a charging mode, and converting by a DC/DC converter the DC voltage into a voltage set according to a load.

The demodulator may extract an envelope of the induction signal in the transmitting terminal, remove a high-frequency component from the induction signal from which the envelope is extracted, calculate a slope by differentiating the induction signal from which the high-frequency component is removed, and generate an output signal to represent a point in time when the slope exceeds a predetermined threshold.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, the present disclosure will be described in detail with respect to embodiments thereof as examples with reference to the accompanying drawings. These embodiments will be described herein in sufficient detail to enable those of ordinary skill in the art to practice the present disclosure. It should be understood that various embodiments of the present disclosure are different from each other but need not be mutually exclusive. For example, specific shapes, structures and characteristics described herein may be implemented in different embodiments without departing from the spirit and scope of the present disclosure in connection with an embodiment. In addition, it should be understood that the position or arrangement of each element in each embodiment set forth herein may be changed without departing from the spirit and scope of the present disclosure. Therefore, the following detailed description is not intended to restrict the present disclosure, and the scope of the present disclosure should be limited only by the appended claims, including all ranges equivalent to that defined in the claims when appropriately described. In the drawings, like reference numerals represent the same or similar functions in various aspects.

Hereinafter, example embodiments of the present disclosure will be described in detail with reference to the accompanying drawings.

Figure 1:
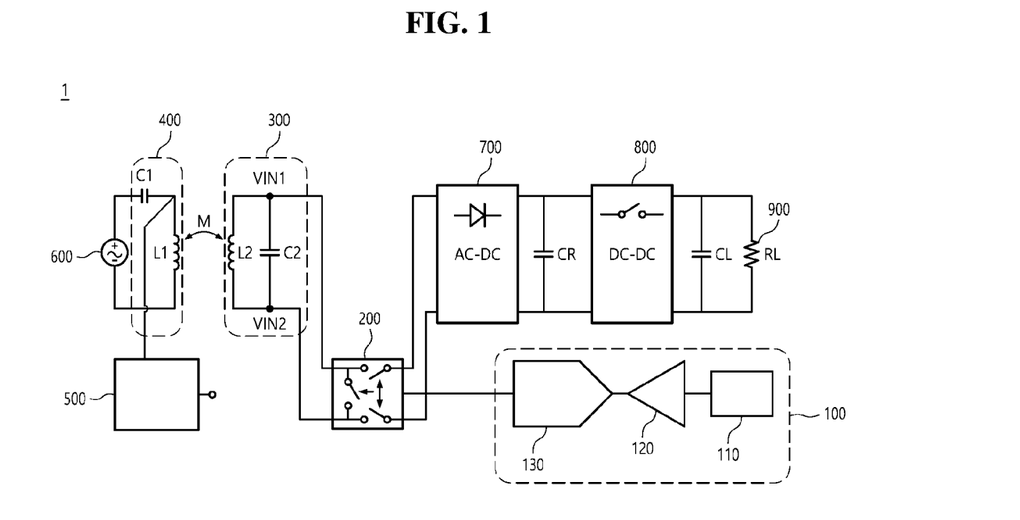
FIG. 1 is a diagram schematically illustrating a back-data transmission circuit according to an embodiment of the present disclosure.

FIG. 1 is a diagram schematically illustrating a back-data transmission circuit according to an embodiment of the present disclosure.

A back-data transmission circuit 1 may include a transmitting terminal 400 and a receiving terminal 300. In this case, the transmitting terminal 400 and the receiving terminal 300 may be understood as inductor-capacitor (LC) resonance terminals and may wirelessly transmit power using a change in a magnetic field.

Accordingly, in the back-data transmission circuit 1, power may be transmitted to the transmitting terminal 400 from a power amplifier or a power source 600 and a voltage may be induced at the receiving terminal 300 due to a change in a magnetic field of the transmitting terminal 400.

Thus, in the back-data transmission circuit 1, an AC voltage generated by the receiving terminal 300 may be converted into a DC voltage through an AC-DC rectifier 700, and the DC voltage may be converted into a voltage set according to a load 900 through a DC-DC converter 800.

Therefore, in the back-data transmission circuit 1, power may be transmitted to the load 900, and in this case, the load 900 may be understood to include various types of applications such as a brain stimulator, a neural signal sensor, and a neural signal recording system.

In this regard, the back-data transmission circuit 1 may establish data communication, and in this case, transmission of data from the transmitting terminal 400 to the receiving terminal 300 may be understood as forward telemetry and transmission of data from the receiving terminal 300 to the transmitting terminal 400 may be understood as back telemetry.

In this case, in the back-data transmission circuit 1, data may be transmitted to the transmitting terminal 400 by changing a voltage of the receiving terminal 300, i.e., the back-data-transfer circuit 1 may be provided to perform back telemetry.

An input module 100 may generate a sensing signal using an arbitrary sensor and digitally convert the sensing signal to generate an input signal.

To this end, the input module 100 may include a sensor unit 110, an amplifier 120, and an analog-to-digital converter (ADC) 130.

The sensor unit 110 may be provided with an arbitrary sensor and thus generate a sensing signal using the sensor.

Here, the arbitrary sensor may be a sensor provided to generate a series of signals on the basis of surroundings, a state of a load, etc.

In an embodiment, the input module 100 may be provided to be implanted in the body and thus the sensor unit 110 may be provided to measure various types of information such as vibration and sound generated in the body.

Thus, the amplifier 120 may amplify the magnitude of the sensing signal, and in this case, a low-noise amplifier may be used as the amplifier 120.

The ADC 130 may digitally convert the sensing signal to generate an input signal.

For example, the ADC 130 may generate the input signal by converting the sensing signal into 0s and 1s. In this case, the ADC 130 may generate the input signal so that 1 appears at a point in time when a voltage variation in the sensing signal exceeds a predetermined threshold.

Therefore, the input signal may be understood as back-data measured and generated by the sensor.

A modulator 200 may generate a modulation signal by performing a modulation operation when there is a change in the input signal. In this case, the modulator 200 may perform the modulation operation by setting an open circuit mode and a short circuit mode in a preset order, starting from a point in time when the change in the input signal occurs.

Here, the open circuit mode may be a mode set to open the receiving terminal 300 and thus the modulator 200 may open the LC resonance terminal of the receiving terminal 300 in the open circuit mode.

In addition, the short circuit mode may be a mode set to short-circuit the receiving terminal 300 and thus the modulator 200 may short-circuit the LC resonance terminal of the receiving terminal 300 in the short circuit mode.

To this end, the modulator 200 may include an open circuit switch and a short circuit switch.

The open circuit switch may be provided to open a receiving terminal on the basis of an input signal in the open circuit mode.

The short circuit switch may be provided to short-circuit the receiving terminal on the basis of the input signal in the short circuit mode.

Thus, the modulator 200 may sequentially set the open circuit mode and the short circuit mode starting from the point in time when the change in the input signal occurs and thus the back-data transmission circuit 1 may be provided such that a certain change in a voltage is detected at the transmitting terminal 400 regardless of a state of the load 900.

In this regard, the modulator 200 may perform the modulation operation in the open circuit mode for a predetermined first time interval from the point in time when the change of the input signal occurs, and perform the modulation operation in the short circuit mode for a predetermined second time interval after the first time interval.

Accordingly, a voltage of opposite ends of a coil of the transmitting terminal 400 may be reduced through the open circuit mode for the first time interval and may be increased through the short circuit mode for the second time interval.

In this case, the first time interval may be set to be longer than the second time interval.

In this case, an output-side resistance of the transmitting terminal 400 may change from infinity to 0 and thus a voltage of the transmitting terminal 400 may not be influenced by the load 900.

When the first time interval and the second time interval are very large in the modulator 200, a voltage of the transmitting terminal 400 may not be influenced by the load 900 but power transfer efficiency (PTE) may be very low.

In this case, the PTE may be understood as a ratio between the amount of power supplied to the load 900 and the amount of power supplied from the transmitting terminal 400.

Accordingly, when the first time interval and the second time interval are finite in the modulator 200, the voltage of the transmitting terminal 400 may reduce when a magnitude of the load 900 is a medium level and increase when the magnitude of the load 900 is a high or low level. In other words, the first time interval and the second time interval may be set based on the magnitude of the load 900.

Alternatively, the modulator 200 may perform the modulation operation in the short circuit mode for the first time interval from the point in time when the change of the input signal occurs, and perform the modulation operation in the open circuit mode for the second time interval after the first time interval.

In this case, a voltage of the opposite ends of the coil of the transmitting terminal 400 may be increased through the short circuit mode for the first time interval and may be decreased through the open circuit mode for the second time interval.

In this case, the second time interval may be set to be longer than the first time interval.

The receiving terminal 300 may induce a modulation signal to the transmitting terminal 400 and transmit the modulation signal thereto. Accordingly, a demodulator 500 may stably reproduce back-data transmitted from the receiving terminal 300 by receiving the modulation signal from the transmitting terminal 400.

To this end, the demodulator 500 may measure an induction signal induced from the receiving terminal 300 to the transmitting terminal 400 and calculate a slope of a voltage change represented by the induction signal to generate an output signal.

In this case, the demodulator 500 may generate the output signal on the basis of a slope in the short circuit mode when the modulator 200 is set in the order of the open circuit mode and the short circuit mode, and generate the output signal on the basis of a slope in the open circuit mode when the modulator 200 is set in the order of the short circuit mode and the open circuit mode.

In other words, the demodulator 500 may generate the output signal on the basis of a slope in the induction signal for the second time interval.

Figure 2:
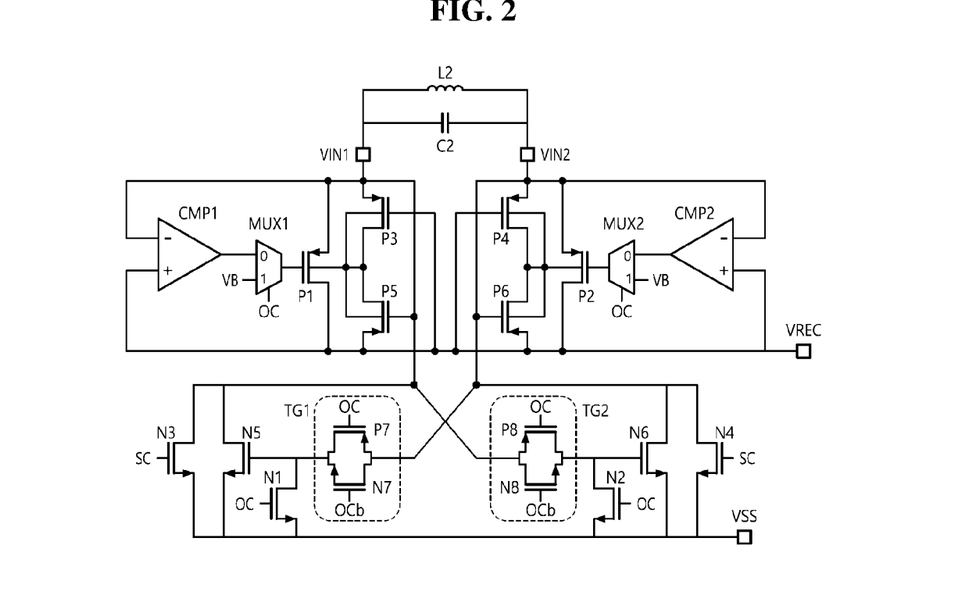
FIG. 2 is a diagram schematically illustrating an example of a modulator of FIG. 1.

FIG. 2 is a diagram schematically illustrating an example of the modulator 200 of FIG. 1.

Referring to FIG. 2, the modulator 200 may be electrically blocked when a voltage is induced from the transmitting terminal 400 to the receiving terminal 300, i.e., the modulator 200 may be electrically blocked in a charging mode in which the load 900 is charged by the power source 600.

Here, L2 and C2 may denote an LC resonance terminal of the receiving terminal 300.

Accordingly, in the charging mode, a voltage induced to the receiving terminal 300 may flow through P1, P2, N5 and N6 in the modulator 200.

In this case, CMP1 and CMP2 may compare VIN1, VIN2 and VREC, which denote voltages of opposite ends of the receiving terminal 300, and output low voltages from CMP1 and CMP2 when VIN1 and VIN2 are higher than VREC, thereby operating P1 and P2.

In this case, selection voltages of MUX1 and MUX2 may be set to zero so that outputs of CMP1 and CMP2 may be transmitted to gate voltages of P1 and P2.

P3, P4, P5 and P6 may generate a dynamic body bias to determine body voltages of P1 and P2.

In this case, voltages of SC and OC may be set to zero to deactivate a telemetry function when the modulator 200 operates in the charging mode.

It may be understood that in the open circuit mode, the modulator 200 operates with open circuit-load shift keying (OC-LSK), thus blocking a path between the LC resonance terminal of the receiving terminal 300 and VREC.

Accordingly, the modulator 200 may set the selection voltages of MUX1 and MUX2 to 1 to stop the operations of P1 and P2.

In addition, because the modulator 200 should prevent voltages from being applied to N5 and N6 through TG1 and TG2 to block operations of N5 and N6, N1 and N2 may be operated such that the voltages to be applied to N5 and N6 become zero.

Here, N1 and N2 may denote open circuit switches.

It may be understood that in the short circuit mode, the modulator 200 operates with short circuit-load shift keying (SC-LSK), thus grounding the LC resonance terminal of the receiving terminal 300.

Accordingly, the modulator 200 may be controlled to operate in the short circuit mode by setting a voltage of SC to 1, thus causing N3 and N4 to operate.

Here, N3 and N4 may denote short circuit switches.

Figure 3:
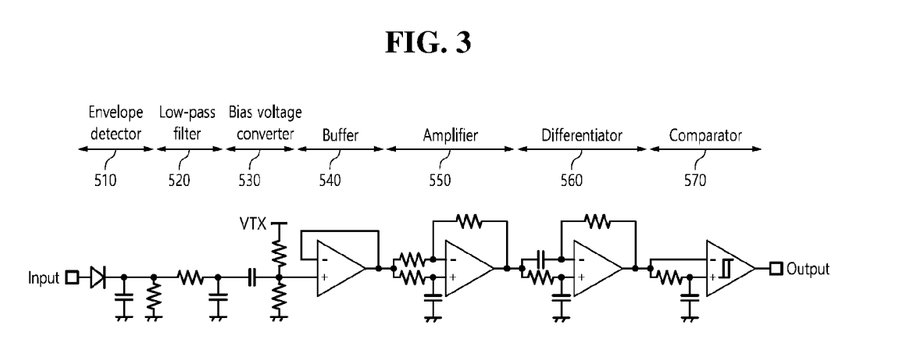
FIG. 3 is a diagram schematically illustrating a demodulator of FIG. 1.

FIG. 3 is a diagram schematically illustrating the demodulator 500 of FIG. 1.

Referring to FIG. 3, the demodulator 500 may extract an envelope from an induction signal in the transmitting terminal 400, remove a high-frequency component of the induction signal from which the envelope is extracted, calculate a slope by differentiating the induction signal from which the high-frequency component is removed, and generate an output signal to represent a point in time when the slope exceeds a predetermined threshold.

To this end, the demodulator 500 may include an envelope detector 510, a low-pass filter 520, a bias voltage converter 530, a buffer 540, an amplifier 550, a differentiator 560, and a comparator 570.

The envelope detector 510 may extract an envelope from an induction signal in the transmitting terminal 400.

In this case, the low-pass filter 520 may remove a high-frequency component of the induction signal from which the envelope is extracted. In an embodiment, the low-pass filter 520 may remove a high-frequency component of 13.56 MHz.

The bias voltage converter 530 may convert the induction signal such that a magnitude of the induction signal from which the high-frequency component is removed is lower than a supply voltage applied to the buffer 540.

In an embodiment, the bias voltage converter 530 may convert a bias voltage of 10 V into a bias voltage of 2.5 V.

Thus, the buffer 540 may separate an output impedance of the bias voltage converter 530 and an input impedance of the amplifier 550, and the amplifier 550 may amplify a signal transmitted from the buffer 540.

The differentiator 560 may calculate a slope by differentiating the induction signal from which the high-frequency component is removed.

Accordingly, the comparator 570 may generate an output signal to represent a point in time when the slope exceeds a predetermined threshold.

Figure 4:
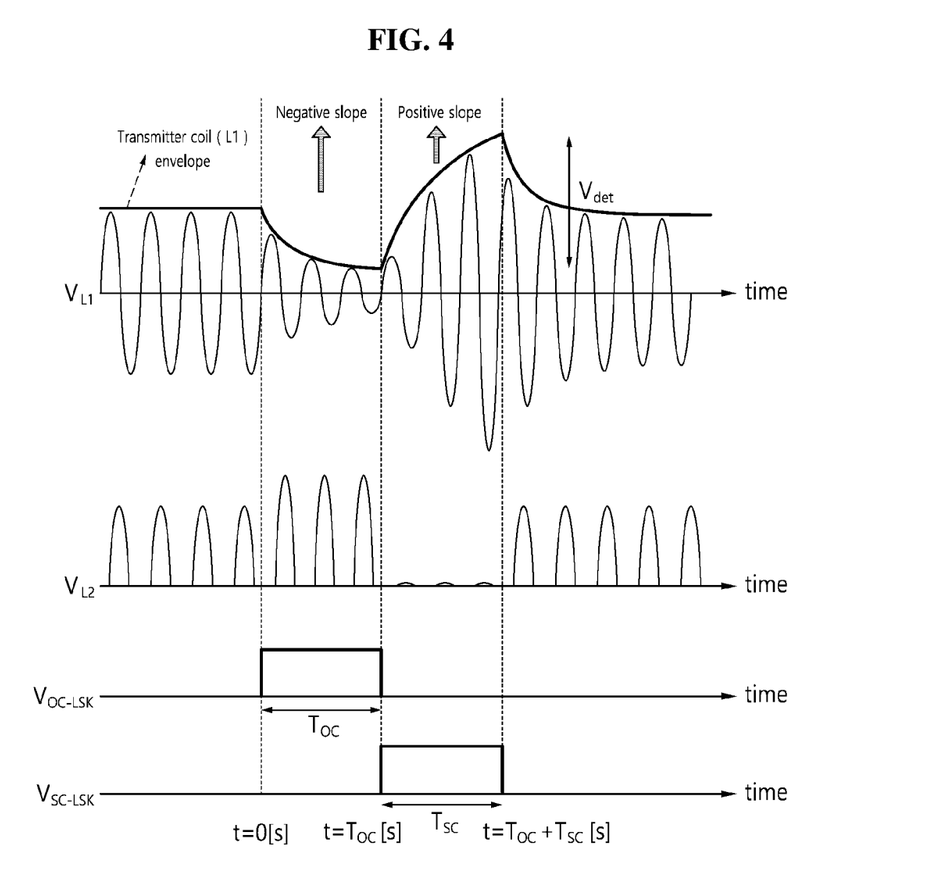
FIGS. 4 and 5 are graphs showing examples of a voltage change occurring at a transmitting terminal of FIG. 1.
Figure 5:
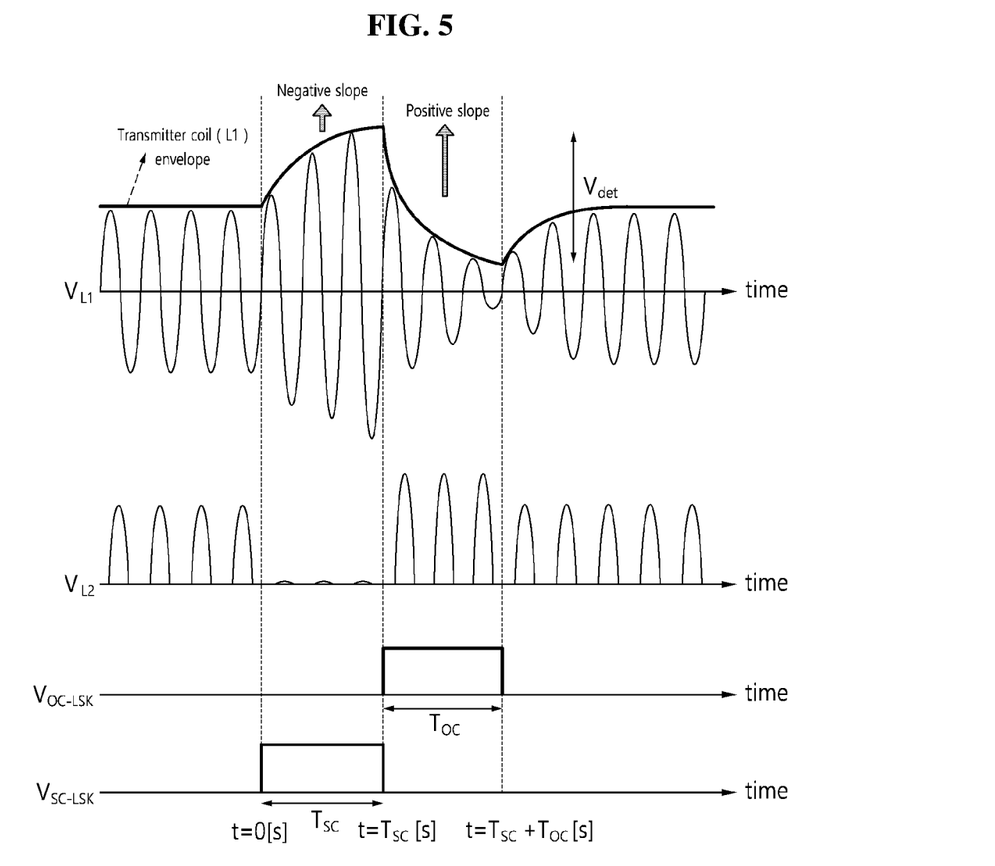

FIGS. 4 and 5 are graphs showing examples of a voltage change at the transmitting terminal of FIG. 1.

Referring to FIG. 4, the modulator 200 may perform the modulation operation to generate a modulation signal when there is a change in an input signal. In this case, the modulator 200 may perform the modulation operation in the open circuit mode for a predetermined first time interval, starting from a point in time when the change in the input signal occurs, and perform the modulation operation in the short circuit mode for a predetermined second time interval after the first time interval.

In this case, a transmitter coil envelope may be understood to mean an envelope of a voltage of a coil of the LC resonance terminal of the transmitting terminal 400. V_L1 may denote a voltage in a coil of the LC resonance terminal of the transmitting terminal 400, and V_L2 may denote a voltage in a coil of the LC resonance terminal of the receiving terminal 300.

V_OC-LSK may denote a graph showing a point in time when the modulator 200 operates in the open circuit mode, and V_SC-LSK may denote a graph showing a point in time when the modulator 200 operates in the short circuit mode.

Accordingly, T_OC may denote the first time interval, and T_SC may denote the second time interval.

As described above, the transmitter coil envelope may change to represent a negative slope when the modulator 200 operates in the open circuit mode, which means that a voltage of the transmitting terminal 400 decreases in the open circuit mode.

In addition, the transmitter coil envelope may change to represent a positive slope when the modulator 200 operates in the short circuit mode, which means that a voltage of the transmitting terminal 400 increases in the short circuit mode.

In this case, the same transmitter coil envelope may appear under heavy and light loads, and thereby the back-data transmission circuit 1 may stably transmit back-data regardless of a magnitude of a load.

Referring to FIG. 5, the modulator 200 may perform the modulation operation to generate a modulation signal when there is a change in an input signal. In this case, the modulator 200 may perform the modulation operation in the short circuit mode for a predetermined first time interval, starting from a point in time when the change in the input signal occurs, and perform the modulation operation in the open circuit mode for a predetermined second time interval after the first time interval.

In this case, a transmitter coil envelope may be understood to mean an envelope of a voltage of a coil of the LC resonance terminal of the transmitting terminal 400. V_L1 may denote a voltage in a coil of the LC resonance terminal of the transmitting terminal 400, and V_L2 may denote a voltage in a coil of the LC resonance terminal of the receiving terminal 300.

V_OC-LSK may denote a graph showing a point in time when the modulator 200 operates in the open circuit mode, and V_SC-LSK may denote a graph showing a point in time when the modulator 200 operates in the short circuit mode.

Accordingly, T_SC may denote the first time interval, and T_OC may denote the second time interval.

As described above, the transmitter coil envelope may change to represent a positive slope when the modulator 200 operates in the short circuit mode, which means that a voltage of the transmitting terminal 400 increases in the short circuit mode.

In addition, the transmitter coil envelope may change to represent a negative slope when the modulator 200 operates in the open circuit mode, which means that a voltage of the transmitting terminal 400 decreases in the open circuit mode.

In this case, the same transmitter coil envelope may appear under heavy and light loads, thereby the back-data transmission circuit 1 may stably transmit back-data regardless of a magnitude of a load.

Figure 6:
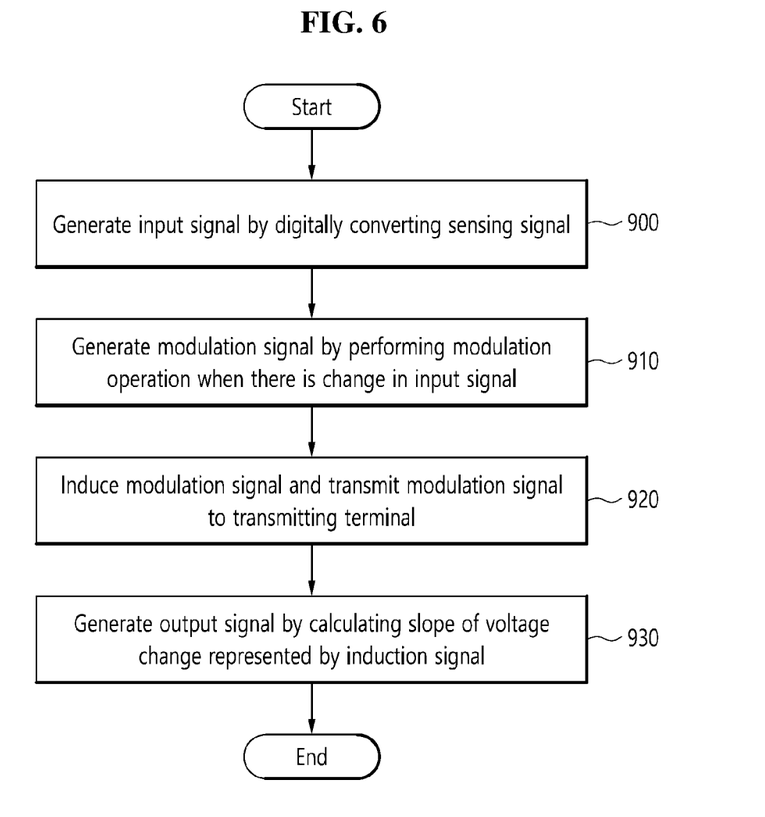
FIG. 6 is a flowchart of a back-data transmission method according to an embodiment of the present disclosure.

FIG. 6 is a flowchart of a back-data transmission method according to an embodiment of the present disclosure.

The back-data transmission method according to an embodiment of the present disclosure is performed by components that are substantially the same as those of the back-data transmission circuit 1 of FIG. 1 and thus the same components are assigned the same reference numerals and a redundant description thereof is omitted here.

The back-data transmission method may include generating an input signal by digitally converting a sensing signal (900), generating a modulation signal by performing a modulation operation when there is a change in the input signal (910), transmitting the modulation signal to a transmitting terminal by inducing the modulation signal thereto (920), and generating an output signal by calculating a slope of a voltage change represented by an induction signal (930).

The generating of the input signal by digitally converting the sensing signal (900) may include generating, by the input module 100 with an arbitrary sensor, the sensing signal and digitally converting the sensing signal to generate the input signal.

The generating of the modulation signal by performing the modulation operation when there is a change in the input signal (910) may include generating the modulation signal by the modulator 200, when there is a change in the input signal, by performing the modulation operation by setting the open circuit mode and the short circuit mode in a preset order, starting from a point in time when the change in the input signal occurs.

The transmitting of the modulation signal to the transmitting terminal by inducing the modulation signal (920) may include inducing, by the receiving terminal 300, the modulation signal and transmitting the modulation signal to the transmitting terminal 400.

The generating of the output signal by calculating the slope in the voltage change from the induction signal (930) may include outputting the output signal, by the demodulator 500, by measuring the induction signal induced from the receiving terminal 300 to the transmitting terminal 400 and calculating the slope of the voltage change represented by the induction signal.

An aspect of the present disclosure described above provides a back-data transmission circuit robust to load changes and a method thereof and thus back-data may be stably performed by reducing the influence of a change in a load in a circuit capable of wirelessly transmitting power.

While the present disclosure has been described above with respect to embodiments thereof, it will be understood by those of ordinary skill in the art that various changes and modifications may be made without departing from the spirit and scope of the present disclosure defined in the following claims.

What is claimed is:

1. A back-data transmission circuit robust to load changes, comprising:
    an input module including an arbitrary sensor and configured to generate an input signal by generating a sensing signal and digitally converting the sensing signal;
    a modulator configured to generate a modulation signal by performing a modulation operation when there is a change in the input signal, the modulation operation being performed by setting an open circuit mode and a short circuit mode in a preset order, starting from a point in time when the change in the input signal occurs;
    a receiving terminal configured to transmit the modulation signal to a transmitting terminal by inducing the modulation signal; and
    a demodulator comprising an envelope detector, a low-pass filter and a differentiator, and configured to generate an output signal by measuring an induction signal induced from the receiving terminal to the transmitting terminal and calculating a slope of a voltage change represented by the induction signal,
    wherein the modulator is configured to:
    perform the modulation operation in the open circuit mode for a preset first time interval from a time when the change in the input signal occurs, and perform the modulation operation in the short circuit mode for a preset second time interval from a time when the first time interval has elapsed, or
    perform the modulation operation in the short circuit mode for the preset first time interval from the time when the chance in the input signal occurs, and perform the modulation operation in the open circuit mode for the preset second time interval from the time when the first time interval has elapsed, and
    wherein the first time interval and the second time interval are set based on a magnitude of a load, such that the modulation operation by the modulator causes a voltage at the transmitting terminal to be unaffected by the load changes.

2. The back-data transmission circuit of claim 1, further comprising:
    an alternate current/direct current (AC/DC) rectifier configured to rectify an AC voltage, which is induced to a receiving terminal by the transmitting terminal, into a DC voltage in a charging mode; and
    a DC/DC converter configured to convert the DC voltage into a voltage set according to the load.

3. The back-data transmission circuit of claim 1, wherein the demodulator is configured to generate, by a comparator, the output signal to represent a point in time when the slope exceeds a predetermined threshold.

4. A back-data transmission method performed by a back-data transmission circuit robust to load changes, the back-data transmission method comprising:
    generating, by an input module with an arbitrary sensor, an input signal by generating a sensing signal and digitally converting the sensing signal;
    generating, by a modulator, a modulation signal by performing a modulation operation when there is a change in the input signal, the modulation operation being performed by setting an open circuit mode and a short circuit mode in a preset order, starting from a point in time when the change in the input signal occurs;
    inducing, by a receiving terminal, the modulation signal and transmitting the modulation signal to a transmitting terminal; and
    generating, by a demodulator, an output signal by measuring an induction signal induced from the receiving terminal to the transmitting terminal and calculating a slope of a voltage change represented by the induction signal,
    wherein the modulator is configured to:
    perform the modulation operation in the open circuit mode for a preset first time interval from a time when the change in the input signal occurs, and perform the modulation operation in the short circuit mode for a preset second time interval from a time when the first time interval has elapsed, or
    perform the modulation operation in the short circuit mode for the preset first time interval from the time when the change in the input signal occurs, and perform the modulation operation in the open circuit mode for the preset second time interval from the time when the first time interval has elapsed, and
    wherein the first time interval and the second time interval are set based on a magnitude of a load, such that the modulation operation by the modulator causes a voltage at the transmitting terminal to be unaffected by the load changes.

5. The back-data transmission method of claim 4, further comprising:

rectifying, by an alternate current/direct current (AC/DC) rectifier, an AC voltage, which is induced by the transmitting terminal to a receiving terminal, into a DC voltage in a charging mode; and converting, by a DC/DC converter, the DC voltage into a voltage set according to a the load.

6. The back-data transmission method of claim 4, wherein the demodulator is configured to generate, by a comparator, the output signal to represent a point in time when the slope exceeds a predetermined threshold.

* * * * *